(12) United States Patent
Alcorn et al.

(10) Patent No.: US 6,263,498 B1
(45) Date of Patent: Jul. 17, 2001

(54) METHOD AND APPARATUS FOR ENABLING SERVER SIDE DISTRIBUTED OBJECT MODIFICATION

(75) Inventors: John William Alcorn, Austin; Karl David Johnson, Round Rock, both of TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/204,520

(22) Filed: Dec. 3, 1998

(51) Int. Cl.[7] .................................................. G06F 9/45
(52) U.S. Cl. ................................................................ 717/11
(58) Field of Search .......................... 717/1, 11; 707/100; 709/201

(56) References Cited

U.S. PATENT DOCUMENTS

| | | | |
|---|---|---|---|
| 5,572,643 | * 11/1996 | Judson | 709/218 |
| 5,699,310 | * 12/1997 | Garloff et al. | 717/1 |
| 5,768,510 | * 6/1998 | Gish | 709/203 |
| 5,848,246 | * 12/1998 | Gish | 709/203 |
| 5,870,719 | * 2/1999 | Maritzen et al. | 705/26 |
| 5,918,052 | * 6/1999 | Kruskal et al. | 717/1 |
| 5,933,144 | * 8/1999 | Alcorn | 345/347 |
| 6,002,874 | * 12/1999 | Bahrs et al. | 717/5 |
| 6,185,730 | * 2/2001 | LeBlanc | 717/1 |
| 6,192,371 | * 2/2001 | Schultz | 707/103 |

OTHER PUBLICATIONS

Johnson, D.; "Charles Schwab and IBM' BeanExtender". Accessed on Oct. 24, 2000. Retrieved from the Internet: http://www-4.ibm.com/software/developer/library/charles-schwab.html?dwzone=java, Mar. 1998.*
IBM Redbooks; Factoring JavaBeans in the Enterprise. IBM Corporation, ISBN: 073840389x, Chapter 4, Dec. 1997.*
LeBlanc, K.; "What is a Dippable JavaBean?".The IBM Developer Connection News, Rel 2, vol. 1, Mar. 1998.*

Fox, O.; "Using BeanExtender's Dipping Technique". Accessed on Oct. 24, 2000. Retrieved from the Internet: http://www-4.ibm.com/software/developer/library, Mar. 1998.*
Apte et al.; "Java Beans In, Java Beans Out". Accessed Oct. 24, 2000. Retrieved from the Internet: http://www-4.ibm.com/software/developer/library, 3/1998.*
Sun Microsystems; "JavaBeans APi Specification". Accessed on Jul. 15, 2000. Retrieved from the Internet http://java.sun.com/beans, 7/1997.*
Emigh, J.; "More on IBM's Bean Dipping, Server Works for Java". Newsbytes, pNEW07100061, 7/1997.*
Computergram International; "Wrap Your Beans in Logic for Security with IBM's New Webrunner Javabeans". Computergram Internatonal, n3200, pCGN0710014, 7/1997.*
Parkes, C.; "Anyone want to go bean dipping?". DBMS, vol. 10, No. 10, pp104, 9/1997.*

* cited by examiner

Primary Examiner—Mark R. Powell
Assistant Examiner—Kelvin Booker
(74) Attorney, Agent, or Firm—Duke W. Yee; David A. Mims, Jr.

(57) ABSTRACT

A method and apparatus in a distributed data processing system for managing application modification in a distributed data processing system. The first portion of an application is morphed, wherein the first portion of the application becomes a dippable application. The first portion of an application containing business rules is placed on a server within the distributed data processing system, wherein the application is accessed by a client. A second portion of the application is placed on a client, wherein the second portion of the application provides access to the first portion of the application. A rule change is identified for the dippable application. A dip is created for the dippable application, wherein the dip incorporates the rule change. The dip is added to the dippable application, wherein the rule change is incorporated into the dippable application without requiring a change to the second portion of the application located on the client.

15 Claims, 4 Drawing Sheets

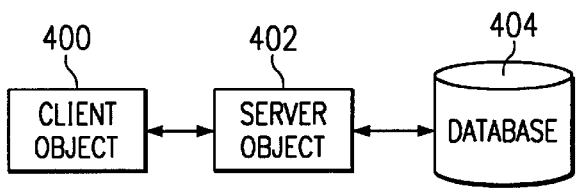
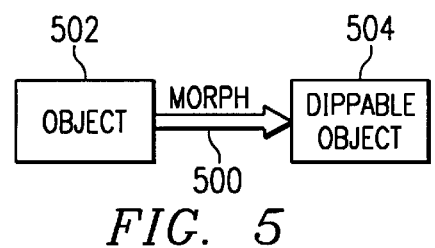
FIG. 4        FIG. 5
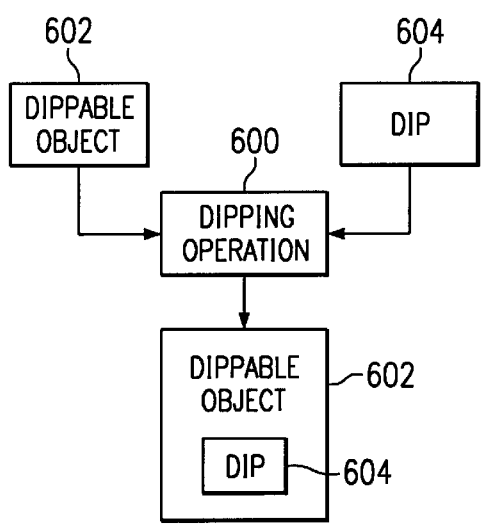
FIG. 6
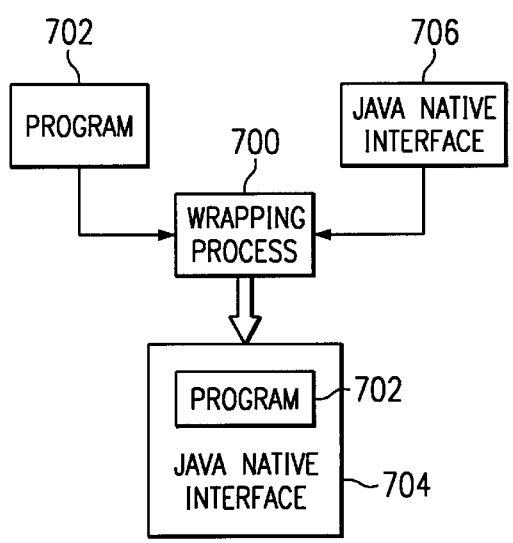
FIG. 7
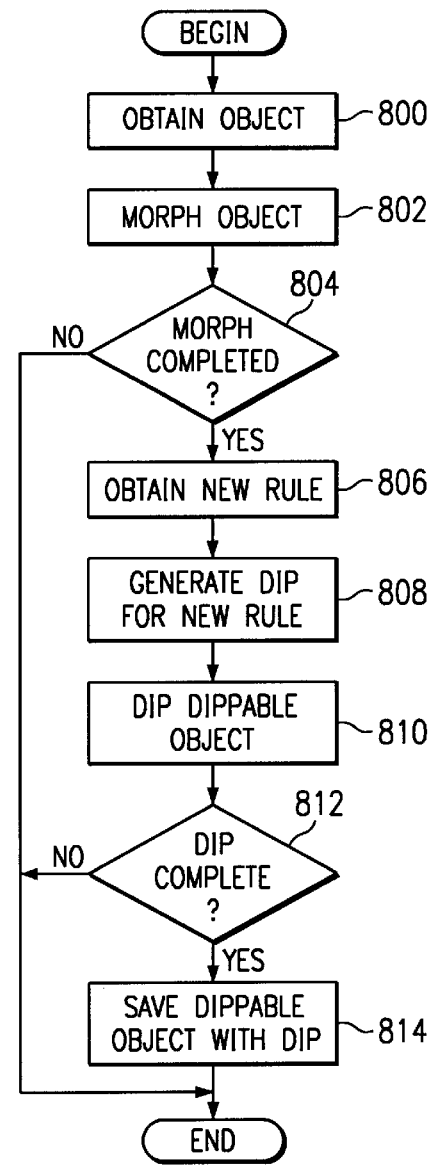
FIG. 8

METHOD AND APPARATUS FOR ENABLING SERVER SIDE DISTRIBUTED OBJECT MODIFICATION

CROSS REFERENCE TO RELATED APPLICATION

The present invention is related to an application entitled Method And Apparatus For Dynamic Application And Maintenance Of Programs, filed Jul. 30, 1998, Ser. No. 09/124,718, assigned to the same assignee and incorporated herein by reference.

BACKGROUND OF THE INVENTION

1. Technical Field

The present invention relates generally to an improved distributed data processing system and in particular to a method and apparatus for managing applications within a distributed data processing system. Still more particularly, the present invention provides an approved method and apparatus for modifying applications in a distributed data processing system.

2. Description of Related Art

A computer includes both a physical machine, namely the hardware, and the instructions which cause the physical machine to operate, namely the software. Software includes both application and operating system programs. If the program is simply to do tasks for a user, such as solving specific problems, it is referred to as application software. If a program controls the hardware of the computer and the execution of the application programs, it is called operating system software. System software further includes the operating system, the program that controls the actual computer or central processing unit (CPU), and device drivers that control the input and output devices (I/O) such as printers and terminals.

A number of application programs are usually present waiting to use the CPU. The operating system determines which program will run next, how much of the CPU time it will be allowed to use, and what other computer resources the application will be allowed to access and use. Further, each application program will require a special input or output device and the application program must transfer its data to the operating system, which controls the device drivers.

A network containing a number of computers may be formed by having these computers, also referred to as "nodes" or "network computers", communicate with each other over one or more communications links, which is an aggregation which is a computer network. Today, many computer workstations are connected to other workstations, file servers, or other resources in a network. Each computer on a network is connected to the network via an adapter card or other similar means, which provides an ability to establish a communications link to the network.

Many types of programs are presently available in both a stand alone form and from a server in a network that employ various rules for decision making. In addition, some programs are executed in a "multi-tier" distributed environment in which applications may use multiple computers to solve specific problems. It is often desirable to modify only the portion of the application on a server as opposed to modifying the portion of the application on a client machine. Modification of the application on the server eliminates the need to redistribute the application to various clients as in the case of changes made to the portion of an application on a client machine. Presently, changes to server side applications have been accomplished by modifying the server side source code and then recompiling the source code. This process involves much overhead and in some cases where source code is not available, it is not possible to use this process.

Therefore, it would be advantageous to have an improved method and apparatus for modifying applications in a distributed data processing system.

SUMMARY OF THE INVENTION

The present invention provides a method in a distributed data processing system for managing application modification in a distributed data processing system. The first portion of an application is morphed, wherein the first portion of the application becomes a dippable application. The first portion of an application containing business rules is placed on a server within the distributed data processing system, wherein the application is accessed by a client. A second portion of the application is placed on a client, wherein the second portion of the application provides access to the first portion of the application. A rule change is identified for the dippable application. A dip is created for the dippable application, wherein the dip incorporates the rule change. The dip is added to the dippable application, wherein the rule change is incorporated into the dippable application without requiring a change to the second portion of the application located on the client.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a diagram illustrating an application in accordance with a preferred embodiment of the present invention;

FIG. 5 is a diagram of a morphing operation in accordance with a preferred embodiment of the present invention;

FIG. 6 is a diagram of a dipping operation in accordance with a preferred embodiment of the present invention;

FIG. 7 is a diagram of a process for providing an interface to a non-object oriented program in accordance with a preferred embodiment of the present invention;

FIG. 8 is a flowchart of a process for adding rules to an object in accordance with a preferred embodiment of the present invention;

DETAILED DESCRIPTION OF THE PREFERRED EMBODIMENT

Figure 1:
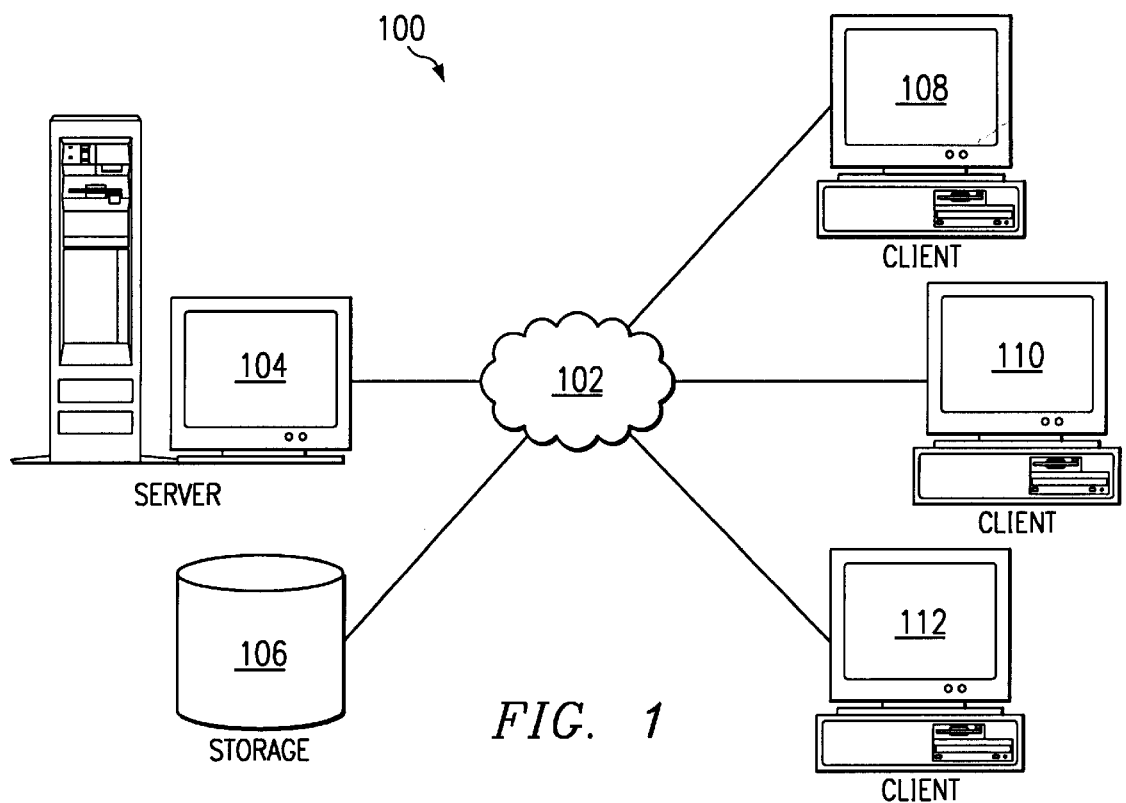
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. In a multi-tier distributed environment, distributed applications are provided in which a portion of the application is located on a server, such as server 104 and another portion of the application is located on a client, such as client 108. In this implementation, the client is considered a first tier system while the server is considered a second tier system. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as for example, an intranet or a local area network.

FIG. 1 is intended as an example, and not as an architectural limitation for the processes of the present invention.

Figure 2:
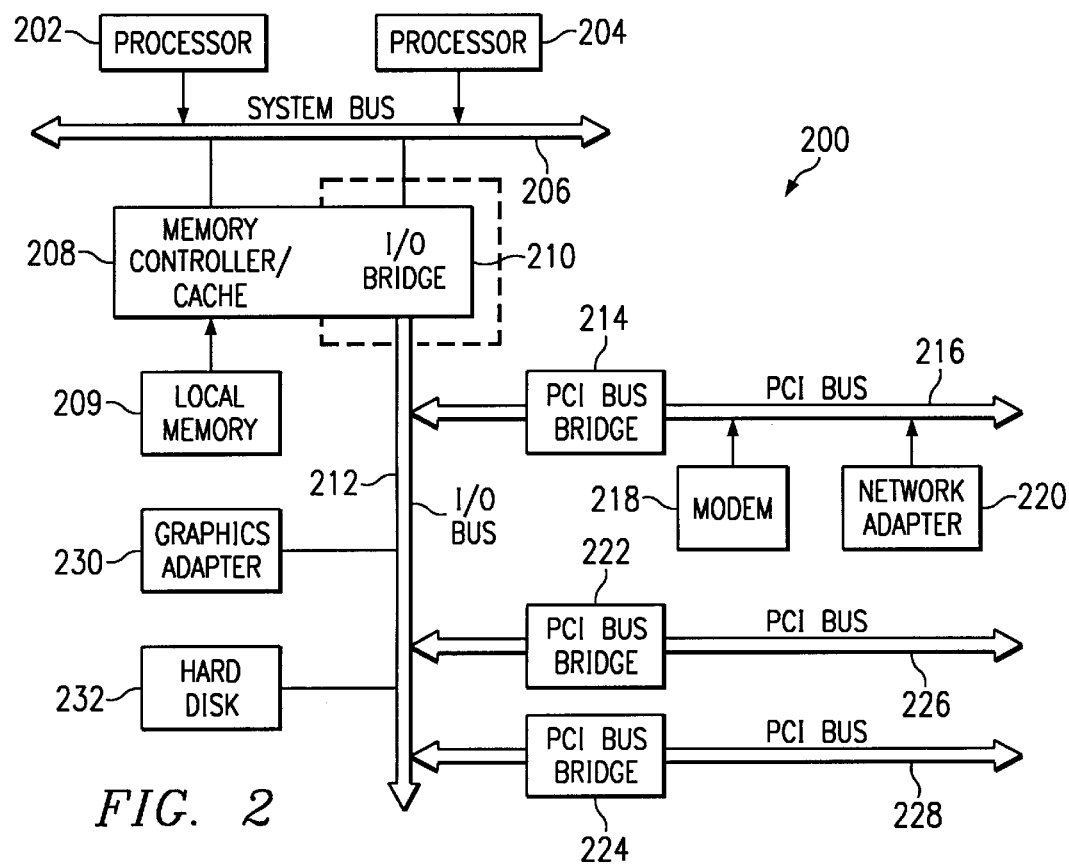
FIG. 2 is a block diagram of a data processing system which may be implemented as a server, in accordance with a preferred embodiment of the present invention.

Referring to FIG. 2, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as an optical disk drive and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
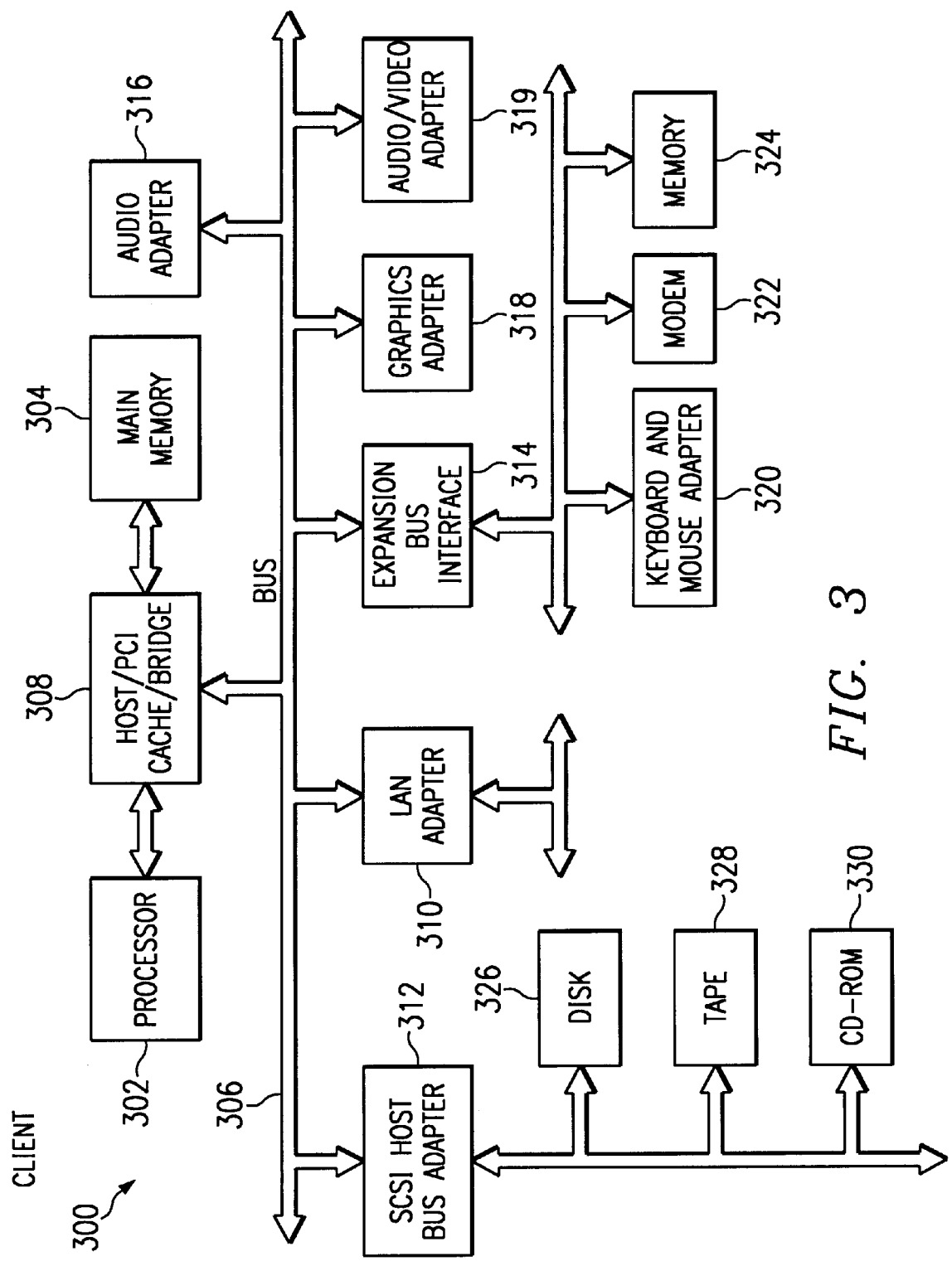
FIG. 3 is a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures such as Micro Channel and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small Computer System Interface (SCSI) host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330 in the depicted example. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. Instructions for the operating system, the object-oriented programming system, and applications or programs are located on storage devices, such as hard disk drive 326 and may be loaded into main memory 304 for execution by processor 302.

Those of ordinary skill in the art will appreciate that the hardware in FIG. 3 may vary depending on the implementation. For example, other peripheral devices, such as optical disk drives and the like may be used in addition to or in place of the hardware depicted in FIG. 3. The depicted example is not meant to imply architectural limitations with respect to the present invention. For example, the processes of the present invention may be applied to multiprocessor data processing system.

The present invention provides a method, data processing system, and instructions for dynamically maintaining programs. In a preferred embodiment of the present invention, the data access functionality is separated into two distinct parts. A client side data access part (DAP) and a server side DAP are present. The server side DAP is a dippable object in accordance with a preferred embodiment of the present invention. The present invention also allows for modification of legacy programs or other programs for which source code is unavailable. A program may be wrapped to turn the program into a Java compatible object using a Java native interface. This Java compatible object may then be morphed into a dippable object to allow for changes and modifications to be made by adding or removing dips from the dippable object.

With reference now to FIG. 4, a diagram illustrating an application is depicted in accordance with a preferred embodiment of the present invention. As can be seen, client object 400 is the client side DAP while server object 402 forms the server side DAP. Client object 400 is located on a client computer, such as, for example, client 108 in distributed data processing system 100 in FIG. 1. Server object 402 is located on a server, such as server 104, in FIG. 1. In the depicted example, two Java beans are employed that implement the client object 400 and server object 402. Client object 400 may initiate calls to server object 402 to access database 404 based on various business rules or business logic implemented within server object 402. Database 404 may be located within the server or be a remote database. In this example, client object 400 contains the functionality required for connection in a client side builder environment. A client side builder environment is a software program that allows one to build an application by connecting various software components that together will form the client side part of a distributed application. Various Java bean design patterns for events, methods, and properties are used so that the appropriate information is made available for connection between client object 400 and other client side components that may be present on the client computer. Also in the depicted example, a customizer is provided to allow a user building a distributed application to configure a host name or the Internet Protocol (IP) address of the second tier computer implementing the server side DAP, server object 402. In this example, a Java remote method invocation (RMI) protocol is employed for distributed communication between objects, such as client object 400 and server object 402. Of course the present invention may be implemented equally well with other types of distributed protocols, such as, for example, the Common Object Request Broker Architecture (CORBA) standard designed by the Object Management Group consortium. CORBA details an object bus that lets objects communicate across enterprises and even continents. It's an Internet done with objects for objects. CORBA was designed to allow intelligent components to discover each other and inter-operate on an object bus. However, CORBA goes beyond just interoperability. It also specifies an extensive set of bus-related services for creating and deleting objects, accessing them by name, storing them in persistent stores, externalizing their states, and defining ad-hoc relationships between them.

In accordance with a preferred embodiment of the present invention, server object 402 contains the actual business logic, which is implemented using BeanExtender developed application programming interfaces (APIs) that utilize the Java defined Java database connectivity (JDBC) structured query language (SQL) database access interface, which provides uniform access to a wide range of relational databases. In the depicted example, these databases may be found in database 404. Server object 402 contains methods used to provide needed functions invoked from client object 400. For example, these functions may include database access to database 404. In addition, in this example, a customizer is provided for server object 402, which allows customization of the JDBC universal resource locator. As well as the database table name, both of which are used in accessing the database through server object 402. In the present invention, the data access part (DAP) bean has been divided into two beans—a DAP client bean and a DAP server bean. The DAP server bean implements two interfaces. One interface contains methods that are used by Dips to modify existing business rules behavior. The other interface contains the methods that are invoked from the DAP client bean and which use JDBC. The above mentioned methods could be written to access other backend systems (i.e. CICS, IMS, MQ, SAP, etc.) and should not be restricted to just JDBC or database access.

The DAP client bean can serve as an event source or an event sink for various events. At build time, the DAP client bean is used in a client side builder environment and is connected to other client side software components. At run time when data is needed from the server, the client DAP bean communicates with its corresponding DAP server bean by using such protocols as RMI (Remote Method Invocation) or IIOP (Internet InterOrb Protocol). For example, at client side build time, as application assembler uses a client side builder environment to connect a GUI bean to the client side DAP so that when a button is pressed an event will be sent to the DAP to retrieve certain data. At server side build time to customize the server side DAP, an application assembler uses a builder environment to display the server side DAPs customizer which allows for such things as customization of the JDBC universal resource locator as well as the database table name. If any Dips are to be applied, we must go through the normal morphing process and then the Dips may be applied. Then at run time, the user presses a button on the client which signifies that certain data is requested for view. The GUI bean generates an event, which is sent to the client side/DAP bean. The client side DAP bean invokes a method on the server side DAP bean requesting the needed data. The server side DAP bean retrieves the data, which may or may not have been changed or filtered because of a DIP being applied on the server side, and sends the data back to the client side DAP bean. The data is then returned by the client side DAP bean to the GUI bean for display to the end user.

With this separation between client object 400 and server object 402, changes to various business logic within server object 402, may be performed using a dipping process to allow application of business rule dips to modify or filter data that is eventually returned by server object 402 to client object 400. These modifications may be made without having to modify client object 400. This is desirable because there may be thousands of clients that access a single server.

In addition, these processes also may be applied to programs written in non-current programming languages, such as COBOL or to programs for which source code is unavailable. Dynamic changes to such programs may be made by creating an interface for the program to make the program compatible with an object-oriented programming system, such as Java. The program may then be modified to be "dippable" to allow for dynamic changes. In this manner, the processes of the present invention may be used to dynamically apply and maintain various logic, such as business rules in existing programs or applications.

In the depicted examples, the processes of the present invention are implemented using the Java programming system, which is an object oriented programming system. Object-oriented programming techniques involve the definition, creation, use, and instruction of "objects". These objects are software entities comprising data elements or attributes and methods, which manipulate data elements. Objects also may include data related to events outside of the object to trigger or control methods within the object.

Objects are defined by defining "classes", which are not objects, but templates, which instruct a compiler how to construct the actual object. For example, a class may specify the number and type of data variables and the steps involved in the functions, which manipulate data. An object is actually created in the program by means of a special function called a constructor, which uses the corresponding class definition and additional information, such as arguments provided during object creation, to construct the object. Objects are destroyed by a special function called a destructor.

Many benefits arise out of three basic properties of object oriented programming techniques: encapsulation, polymorphism and inheritance. Objects can be designed to hide, or encapsulate, all or a portion of, the internal data structure and the internal functions. More particularly, during program design, a program developer can define objects in which all or some of the data variables and all or some of the related methods are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and prevents the program from being run.

Polymorphism allows objects and functions which have the same overall format, but which work with different data, to function differently to produce consistent results. For example, an object may have format of attribute data and methods to support a geometric shape. The same format can be used whether the shape is a rectangle or a circle. However, the actual program code which performs the shape formation may differ widely depending on the type of variables which comprise the shape. After the methods have been defined, a program can later refer to the shape formation method by its common format and, during compilation, the compiler will determine which of the shaping methods to be used by examining the variable types. The compiler will then substitute the proper function code.

A third property of object oriented programming is inheritance which allows program developers to reuse preexisting programs. Inheritance allows a software developer to define classes and the object which are later created from them as related through a class hierarchy. Specifically, classes may be designated as subclasses of other basic classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

A set of predefined, interconnected classes are sometimes provided to create a set of objects and additional miscellaneous routines which are all directed to performing commonly encountered tasks in a particular environment. Such predefined classes are typically called "frameworks" and essentially provide a prefabricated structure as a basis for creating a working application program.

In object oriented programming such as the previously described Java system, a developer is provided a framework, containing a set of predefined interface objects. The framework contains predefined classes which can be used as base classes and a developer may accept and incorporate some of the objects into these base classes, or the developer may modify or override objects or combinations of objects in these base classes to extend the framework and create customized solutions in particular areas of expertise.

A clarification of the term "framework" as used in object-oriented programming is in order. Frameworks are predefined structures for objects, combinations of objects which form more extensive objects and eventually combinations which provide whole programs.

Frameworks are employed in which predefined, interconnected classes are organized to provide a structure that is the basis for creating a program. In Java, a framework is present that contains predefined classes used as base classes. Objects may be incorporated into these base classes of objects or combinations of objects.

Java is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods.

The Java virtual machine (JVM) is a virtual computer component that resides in memory. In some cases, the JVM may be implemented in a processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures.

To enable a Java application to execute on different types of data processing systems, a compiler typically generates an architecture-neutral file format—the compiled code is executable on many processors, given the presence of the Java run-time system. The Java compiler generates bytecode instructions that are non-specific to a particular computer architecture. A bytecode is a machine independent code generated by the Java compiler and executed by a Java interpreter. A Java interpreter is a module in the JVM that alternately decodes and executes a bytecode or bytecodes. These bytecode instructions are designed to be easy to interpret on any computer and easily translated on the fly into native machine code.

With reference now to FIG. 5, a diagram of a morphing operation is depicted in accordance with a preferred embodiment of the present invention. A morphing operation is applied to object 502 to create a new dippable object 504. Dippable object 504 is object 502 with modifications that allow it to accept additional behavior in the form of a dip. A "dip" is a class that has an interface that allows the class to be used by a dippable object. In essence, dippable object 504 looks and behaves like object 502, but has the added ability to accept behavioral modification components. Object 502 may be a Java class, such as, for example, a flight reservation program used to select and make reservations for airline flights. Typically, the application is often split into client and server classes in which the class containing the business rules or logic, is maintained on the server and the class containing the presentation logic is maintained on the client. The server class will be morphed, while the client class uses the morphed business logic because it looks and behaves the same. When the object is morphed through morphing operation 500, the object becomes a dippable object such that the rules or logic used in selecting flights and making reservations may be altered. Morphing results in a new class that looks and behaves like before, but has the function of accepting new behaviors in the form of dips. For example, new behavior may be added to the flight reservation program to offer direct flights if they are no more than $100.00 more than a connecting flight. The change in behavior involves adding one or more rules in the depicted example. In addition, the change in behavior also may involve or change an existing rule within the class. These changes are implemented using dips as will be described in more detail below. A business rule defines how to run a business process. Businesses will define rules for operating the business. In the depicted example regarding flight reservation program, a decision was made that no flights can be taken if a direct flight costs $100.00 more than a connecting flight. Typically, implementation of business rules tend to show up in accounting systems and other places, which check to see if the rules of a business process are being followed. In the depicted example, the travel department for the business has modified the flight reservation system to enforce current business rules, without having to modify any of the thousands of clients that access the server.

Turning now for FIG. 6, a diagram of a dipping operation is depicted in accordance with a preferred embodiment of the present invention. After an object has been made dippable, behavior modifications may be made using dipping operation 600. Dipping operation 600 uses dippable object 602 and dip 604 as inputs to attach dip 604 to dippable object 602. A dip is an implementation of a dip interface (a class), which allows the class to perform two things: (1) a dip allows an instance of a class which implements the dip interface to be associated with (attached to) an instance of a dippable class, and (2) a dip allows an instance of the class which implements the dip interface, which has been associated with an instance of a dippable class, to modify the behavior of an instance of the dippable class. Dipping is the operation, which associates an instance of the dip class with an instance of a dippable class. Dip 604 encapsulates behavior that is to be added to dippable object 602. In addition, dip 604 controls dippable object 602 with respect to the added behavior. For example, with a flight selection program that has been morphed to be dippable, a dip in the form of a rule for selection of direct flights may be added to modify the behavior or the flight selection program without having to modify the code or instructions for the flight selection program, and without having to modify the client-side DAP.

Morphing and dipping are both used to modify a program to add or modify behavior of the object. In addition, added or modified behavior may be easily removed at a later time by removing the dip. For example, if direct flights that are no more that $100.00 above the cost of a connecting flight are no longer a requirement, the dip for that rule may be removed. If the price differential is to be no more than $300.00, the old dip may be removed and a new dip containing the new limit may be added to the flight reservation program. Alternatively, the existing dip may be customized to change a property, which represents the price differential without removing and reapplying the dip. In addition, new dips may be added to the object. For example, a new business rule temporarily restricting use of a particular airline due to terrorist threats could be implemented as a dip to add a new business rule in conjunction with the existing rule regarding price differentials. In this manner, the original object does not need to be modified in order to change the behavior. The addition and/or removal of dips allows for the desired flexibility.

Morphing is a means by which an existing class is examined and duplicated as a subclass such that all methods, events, and properties of the original class can have "before" and "after" notifications performed. In addition, any "before" notification can also veto the execution of the method, property, or event. This mechanism is handled by applying a dip to the subclass resulting from the morphing. The dip then uses the "before" and "after" notifications to modify the behavior of the subclass and therefore the original class. The combined subclass and dip(s) are then saved as a single component. More information on morphing and dipping objects can be found in assignee's co-pending U.S. patent application entitled "An Object Oriented Programming System With Objects For Dynamically Connecting Functioning Programming Objects With Objects For General Purpose Operation", LeBlanc et al., Ser. No. 08/953,345, filed Oct. 17, 1997, which is incorporated herein by reference. In this application, "morphing" is described as a process for creating hooks in a connecting object, which fires events to notify interested object. Morphing is the means by which an original general purpose Bean is extended using a connecting layer to hook the original Bean's property changes, event generation, and method calls and notify any interested context layer objects (dips) to produce a dippable general purpose Bean.

To begin, one must understand dips. Dips are beans (reusable software components) that react to state changes in dippable beans to which they are attached. Dippable beans are beans that have been run through a morphing tool, in which the bean is wrapped with an API, so that dips can be applied. Dips modify the runtime behavior of the beans to which they are attached, but they do not provide new interfaces on beans to which they are attached. Dips are attached through the EventListener model. This one-way communication mechanism, while limiting, can be used to add behaviors to a dippable bean. However, if the original bean was thread safe, its dippable version remains thread safe. If the original bean was immutable, the original bean part of the dippable bean remains immutable. The original bean part is what is visible to the clients of the bean. Though dips can add behavior, they cannot add new properties, events, or methods to the bean.

The dipping framework allows the user to take an existing Java class and produce a new class to which dips can be applied. This can be done in one of the following ways: (1) take an existing class and create a new dippable class as a child of the original, parent class; or (2) take an interface and a corresponding implementation class and create a new dippable class that implements the interface and uses the implementation class.

In each case, the new dippable class implements the dippable interface. If desired, the new dippable class could implement the dippable extended interface, which is a child of the dippable interface. Therefore, all dippable classes, even those implementing the dippable extended interface, are implementations of the dippable interface.

During the creation of a new dippable class, dips can be added to the class definition of the dippable bean. Because dips can be added to an instance of a dippable bean, instances of the same class can have different behaviors applied to them through the dipping process. The dipping concept creates a step between development and deployment for Java applications. This step allows new behaviors to be added to existing binary objects.

A dippable bean allows dips to intercept properties, methods, and events. All set<PropertyName>()(1) methods are treated as property-related. All fire<EventName>() or process<EventName>()methods are treated as event-related.

The dipping framework works outside of a beans' environment and works on any Java class that follows the Java beans naming strategy.

With reference now to FIG. 7, a diagram of a process for providing an interface to a non-object oriented program is depicted in accordance with a preferred embodiment of the present invention. Wrapping process 700 is employed to turn program 702 into a Java compatible object 704 using Java native interface 706. A Java native interface is a native programming interface that allows Java code that runs inside a Java virtual machine to interoperate with applications and libraries written in other programming languages, such as C, C++ and assembly. Program 702, in the depicted example, is in a language, such as COBOL, which is not usable in the morphing process described above. Wrapping and layering are ways of changing an interface to a programming system. In the depicted example, the interface from a procedural system, possibly implemented in COBOL, is changed to an object-oriented interface implemented in Java. Wrapping tends to be associated with object-oriented systems in which a wrapper overrides the behavior of an existing object and layering tends to be used in procedural systems although they both perform similar functions (i.e., change the interface). Wrapping process 700 encapsulates program 702 in a wrapper, which provides a new interface from the underlying system, program 702. The implementation of the wrapper in the depicted example, uses Java native interface 706 to generate calls to the underlying program. In the depicted example, Java native interface 706 is like a layer on top of a procedural base system. With Java native interface 706, program 702 forms an object that can be morphed in accordance with a preferred embodiment of the present invention. Java native interface 706 is used to translate messages from other Java objects or components into calls used by program 702 and to translate responses from program 702 into messages that are recognized by Java objects or components. In addition, wrapping may be applied to other systems, such as, for example, Data Base Management System (DBMS) or a rule based system.

With reference now to FIG. 8, a flowchart of a process for adding rules to an object is depicted in accordance with a preferred embodiment of the present invention. The process in FIG. 8 is applied to create a dippable object from a Java object and to add a rule to the object. The process begins by obtaining an object for which a rule is to be added (step 800). Next, the object is morphed (step 802). A determination is made as to whether the morphing process was successfully completed (step 804). If the process was not successful, the process terminates. If the morphing process is successful, a dippable object has been produced. Then, a new rule that is to be added to the object is obtained (step 806). A dip is generated for the new rule (step 808). For example, the business logic of a CICS application may have an object oriented Java wrapper class which exposes the business logic of the CICS application as methods which have return values and take arguments, but their implementation is delegated to the CICS application using a layer of software such as a Java native interface. CICS is a known transactional programming system. In addition, it is assumed in this example that the implementation of this Java wrapper class has been morphed and that new business rules are implemented as dips which are dynamically attached to the Java wrapper class.

When business logic is no longer needed or is desired to be temporarily inhibited, a business rule dip can be written to do the following: (1) when it is dipped onto the morphed Java wrapper class, it registers an interest in being notified of an attempt to use the obsolete business logic; and (2) when notified, it prevents the execution of the business logic by throwing a veto exception which tells the dipping framework to not call the business logic.

In the depicted example, two ways exist to modify the behavior of existing business logic using a business rule dip. One is to change its input, while the other is to modify its output.

Modifying existing business logic by changing the input is accomplished by the following: (1) when the business rule is dipped onto the morphed Java wrapper class, it registers an interest in being notified in an attempt to use the business logic which needs to be modified; and (2) when notified, it examines the input parameters to the method, modifies them to fit the new business rule, and then lets the execution of the existing business logic continue. A call is made to a method to run some business logic in a dippable class that has a dip attached to it. The dip intercepts that call and looks at the arguments and properties (the input to the method on the dippable class). The dip then modifies the arguments and properties to fit the new business rule and lets the intercepted method call with the new argument and property values proceed.

The output of the business logic can be modified by registering for notification as above but this time it registers to be notified after the business logic has completed. A call is made to a method to run some business logic in a dippable class that has a dip attached to it. The dip intercepts the completion of the business logic (the return) and examines the return value, and any output arguments and/or properties. The dip then modifies the return value and/or output arguments and properties of the dippable class to fit the new business rule. The return then completes.

When notified, the business rule can examine and optionally modify the output of the business rule. This can include both return values and the actual content of the data attributes of the Java wrapper class.

The dippable object is dipped (step 810) with the new business rule dip. Next, a determination is made as to whether the dipping process was successfully completed (step 812). If the dipping process was not successfully completed, the process terminates. Successful completion of the dipping process results in saving of the dippable object with the dip (step 814) with the process terminating thereafter.

Figure 9:
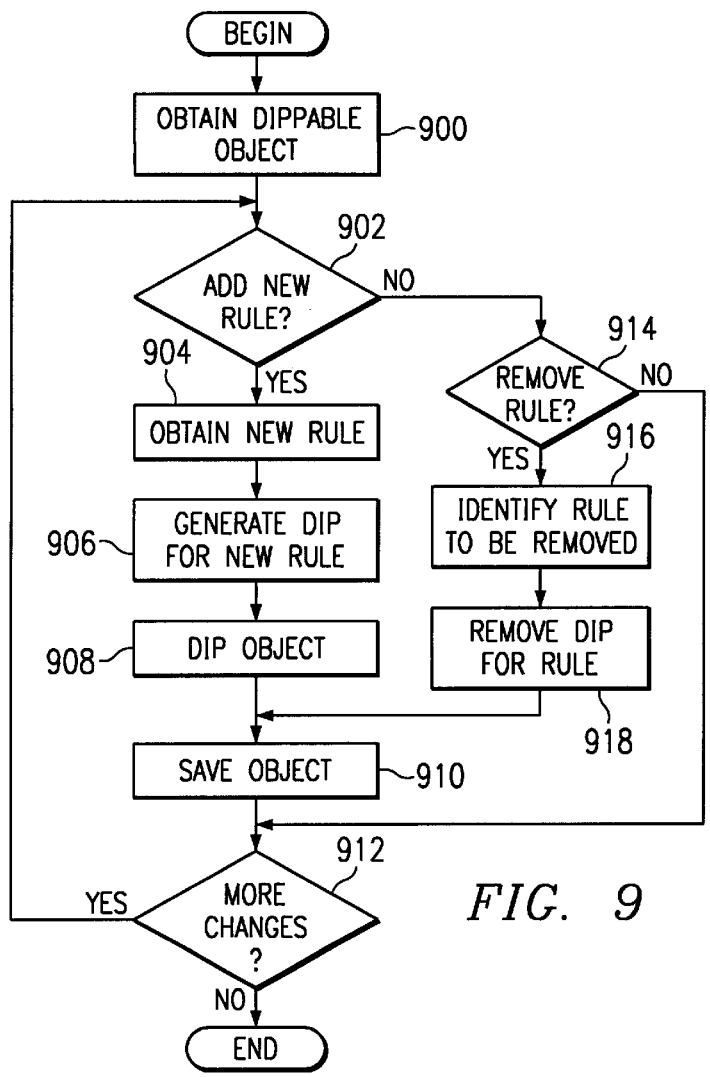
FIG. 9 is a flowchart of a process for adding and removing rules from a dippable object in accordance with a preferred embodiment of the present invention.

Turning next to FIG. 9, a flowchart of a process for adding and removing rules from a dippable object is depicted in accordance with a preferred embodiment of the present invention. This process may be applied to dippable objects with and without dips. The process begins by obtaining the dippable object that is to have its behavior modified (step 900). A determination is made as to whether a new rule is to be added to the dippable object (step 902). If a new rule is to be added, the new rule is then obtained (step 904), and a dip is generated for the new rule (step 906). Thereafter, the dippable object is dipped using the dip generated for the new rule (step 908). The modified dippable object with the new dip is then saved (step 910). A determination is then made as to whether more changes are to be made to the dippable object (step 912). If more changes are to be made, the process then returns to step 902. Otherwise the process terminates.

With reference again to step 902, if a new rule is not to be added, a determination is made as to whether a rule is to be removed (step 914). If a rule is not to be removed, the process then proceeds to step 912 as previously discussed. Otherwise, the rule to be removed is identified (step 916). The dip for the rule to be removed is then removed from the object (step 918). In addition, dips can declare themselves as non-removable. Then the process proceeds to step 910 to save the object.

Figure 10:
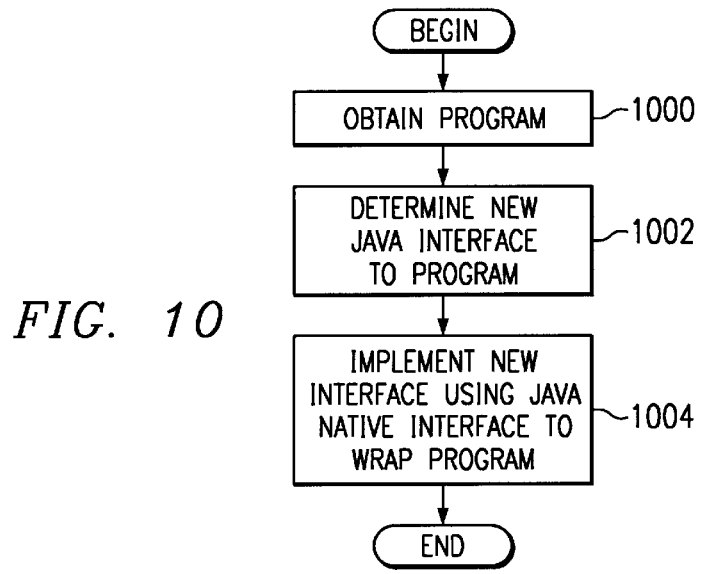
FIG. 10 is a flowchart of a process to create an object oriented representation of a program in accordance with a preferred embodiment of the present invention.

Turning next to FIG. 10, a flowchart of a process to create an object oriented representation of a program is depicted in accordance with a preferred embodiment of the present invention. This process is employed when a program is to have rules changed and is not compatible with the morphing process. This process is used to create a Java object using a wrapping process. The process begins by obtaining the program to be modified (step 1000). The program to be modified may be for example, a COBOL program or any other non-Java object. The process then determines a new Java interface to the program (step 1002). An implementation (a class) of the Java interface is created (step 1004) which may use a Java native interface to execute the program's function. The Java class uses the Java native interface to generate calls or messages in a form recognized by the program in response to receiving messages from a Java object. The Java native interface used by the class can also create response recognized by Java objects when responses are generated by the program. This implementation class allows a morphable Java class to be created, which can communicate with or execute the function of the program to create a Java object that can be morphed.

Thus, the present invention provides an improved method and apparatus for applying and maintaining rules in applications. This advantage is provided through morphing a Java object to create a dippable object and modifying the rules employed by the object by adding a dip. Non Java objects or programs can be modified by adding an interface that allows the objects or programs to be modified using dips.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a distributed data processing system for managing application modification in a distributed data processing system, the method comprising the data processing system implemented steps of:

morphing a first portion of an application, wherein the first portion of the application becomes a dippable application;

placing the first portion of the application containing business rules on a server within the distributed data processing system, wherein the application is accessed by a client;

placing a second portion of the application on a client, wherein the second portion of the application provides access to the first portion of the application;

identifying a rule change for the dippable application;

creating a dip for the dippable application, wherein the dip incorporates the rule change; and adding the dip to the dippable application, wherein the rule change is incorporated into the dippable application without requiring a change to the second portion of the application located on the client.

2. The method of claim 1, wherein the first portion of the application is a plurality of beans.

3. The method of claim 2, wherein the step of morphing comprises morphing a single bean within the plurality of beans.

4. The method of claim 1, wherein the second portion of the application is used to invoke access to a database by the first portion of the application and wherein the first portion of the application returns data to the second portion of the application using the business rules.

5. The method of claim 1, wherein the first part of the application includes a plurality of rules implemented as a plurality of dips and further comprising:

identifying a rule that is an invalid rule;

identifying a dip within the plurality of dips that incorporates the invalid rule; and removing the dip that incorporates the invalid rule.

6. The method of claim 1, wherein the first part of the application includes a plurality of business rules implemented as a plurality of dips and further comprising:

identifying a rule within the plurality of business rules that requires a modification;

creating a new dip incorporating the modification;

identifying a dip within the plurality of dips incorporating the rule; and replacing the dip with the new dip.

7. A method for managing applications in a distributed data processing system, the method comprising the computer implemented steps of:

providing an application to a client computer, wherein a first portion of the application is located on a server computer and a second portion of the application is located on the client computer and wherein the application includes business rules that are located in the first portion of the application and wherein the business rules in the application are located in dippable beans; and modifying a business rule within the business rules by adding a dip to a dippable bean within the plurality of dippable beans containing the business rule, wherein changes to the second portion of the application are unnecessary.

8. A distributed data processing system for managing program modification:
   a client side object located on a client computer, wherein the client side object generates a request to access data; and
   a server side object located on a server computer, wherein the server side object is a dippable object that includes business rules, receives requests from the client side object, and returns data to the client object using the business rules.

9. The distributed data processing system of claim 8, wherein business rules within the server side object are modified by adding a dip to the server side object and wherein a requirement to modify the client side object is absent.

10. The distributed data processing system of claim 8, wherein the server side object includes a set of dips incorporating business rules and wherein the server side object is modified by removing a dip from the set of dips and wherein a requirement to modify the client side object is absent.

11. A distributed data processing system for managing application modification in a distributed data processing system, the distributed data processing system comprising:
   morphing means for morphing a first portion of an application, wherein the first portion of the application becomes a dippable application;
   first placing means for placing the first portion of the application containing business rules on a server within the distributed data processing system, wherein the application is accessed by a client;
   second placing means for placing a second portion of the application on a client, wherein the second portion of the application provides access to the first portion of the application;
   identifying means for identifying a rule change for the dippable application;
   creating means for creating a dip for the dippable application, wherein the dip incorporates the rule change; and
   adding means for adding the dip to the dippable application, wherein the rule change is incorporated into the dippable application without requiring a change to the second portion of the application located on the client.

12. The distributed data processing system of claim 11, wherein the first part of the application includes a plurality of rules implemented as a plurality of dips and further comprising:
   first identifying means for identifying a rule that is an invalid rule;
   second identifying means for identifying a dip within the plurality of dips that incorporates the invalid rule; and
   removing means for removing the dip that incorporates the invalid rule.

13. The distributed data processing system of claim 11, wherein the first part of the application includes a plurality of business rules implemented as a plurality of dips and further comprising:
   first identifying means for identifying a rule within the plurality of business rules that requires a modification;
   creating means for creating a new dip incorporating the modification;
   second identifying means for identifying a dip within the plurality of dips incorporating the rule; and
   replacing means for replacing the dip with the new dip.

14. A distributed data processing system for managing applications in a distributed data processing system, the distributed data processing system comprising:
   providing means for providing an application to a client computer, wherein a first portion of the application is located on a server computer and second portion of the application is located on the client computer and wherein the application includes business rules that are located in the first portion of the application and wherein the business rules in the application are located in dippable beans; and
   modifying means for modifying a business rule within the business rules by adding a dip to a dippable bean within the plurality of dippable beans containing the business rule, wherein changes to the second portion of the application are unnecessary.

15. A computer program product in a distributed data processing system for managing application modification in a distributed data processing system, the computer program product comprising the data processing system implemented steps of:
   first instructions for morphing a first portion of an application, wherein the first portion of the application becomes a dippable application;
   second instructions for placing the first portion of application containing business rules on a server within the distributed data processing system, wherein the application is accessed by a client;
   third instructions for placing a second portion of the application on a client, wherein the second portion of the application provides access to the first portion of the application;
   fourth instructions for identifying a rule change for the dippable application;
   fifth instructions for creating a dip for the dippable application, wherein the dip incorporates the rule change; and
   sixth instructions for adding the dip to the dippable application, wherein the rule change is incorporated into the dippable application without requiring a change to the second portion of the application located on the client.

* * * * *